Figure 1:
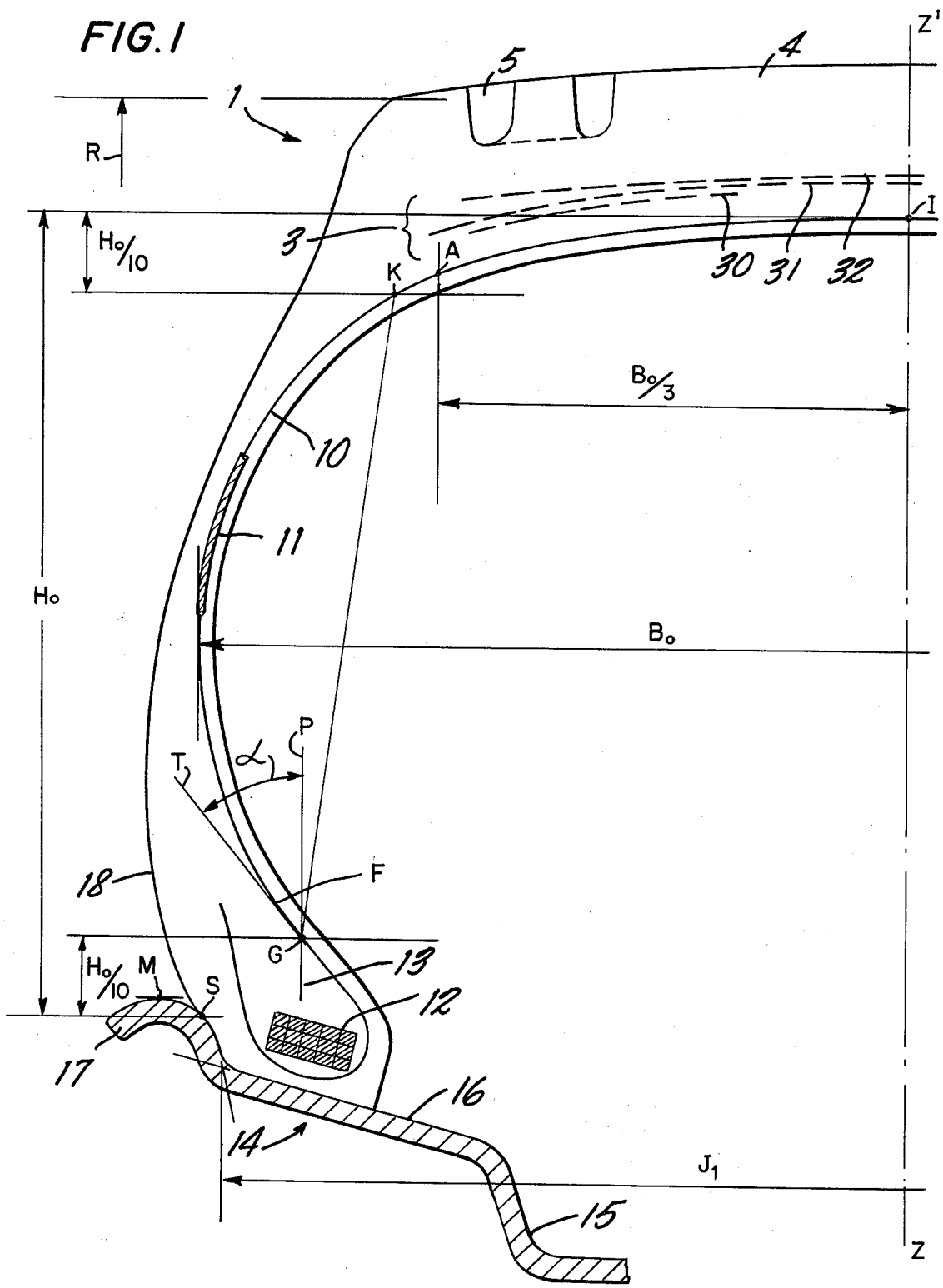

United States Patent [19]

Giron

[11] 4,345,634
[45] Aug. 24, 1982

[54] TIRE FOR MEDIUM AND HEAVY CARRIER VEHICLES

[75] Inventor: Daniel G. Giron, Greer, S.C.

[73] Assignee: Michelin Recherche et Technique S.A., Basel, Switzerland

[21] Appl. No.: 156,338

[22] Filed: Jun. 4, 1980

[51] Int. Cl.³ .......................... B60C 9/08; B60C 3/00
[52] U.S. Cl. .......................... 152/353 R; 152/354 R; 152/359; 152/362 R; 152/209 R
[58] Field of Search ................. 152/352–353, 152/354–359, 362 R, 362 CS, 209 R

[56] References Cited

U.S. PATENT DOCUMENTS

| | | | |
|---|---|---|---|
| 3,515,196 | 6/1970 | Floria | 152/352 R |
| 3,789,900 | 2/1974 | Verdier | 152/361 R |
| 4,037,637 | 7/1977 | Arimura et al. | 152/352 R |

*Primary Examiner*—Edward C. Kimlin
*Assistant Examiner*—Lois E. Boland
*Attorney, Agent, or Firm*—Brumbaugh, Graves, Donohue & Raymond

[57] ABSTRACT

The properties of a belted radial tire for medium and heavy carrier vehicles are improved by providing a specific trace of the neutral fiber of the radial carcass reinforcement when the mounted tire not under load changes from uninflated to inflated state so that harmful stresses in the shoulder region upon inflation are avoided or considerably reduced.

13 Claims, 2 Drawing Figures

TIRE FOR MEDIUM AND HEAVY CARRIER VEHICLES

This invention relates to tires for medium and heavy carrier vehicles having a tread, a radial carcass reinforcement anchored to at least one bead ring in each bead and a tread reinforcement formed of at least two plies of wires or cables parallel in each ply and crossed from one ply to the next, forming acute angles with the longitudinal direction of the tire.

The decrease in the aspect ratio (ratio of the radial height of the meridian cross section to its maximum axial width of tires in order to reduce the weight and size, improve the accessibility of medium and heavy carrier vehicles and replace twin tires by a single tire results in harmful deformations of the edges of the tread of the tires of the type in question under the effect of the inflation pressure.

One remedy consists in reinforcing the belting of the radial carcass reinforcement on the edges of the tread reinforcement. Other solutions consist in vulcaninizing the tire in a mold whose meridian cross section either has a maximum axial width less than that of the tire when mounted and inflated, or an axial distance between the beads which is greater than that present in the tire when mounted and inflated. The major drawback of these solutions resides in the accumulation of stresses under the effect of inflation within critical regions of the tires prior to the application of the operating stresses.

The object of the present invention is to avoid or at least considerably reduce the creation of stresses in the regions of the shoulders caused by inflation and, in this way, the drawbacks caused by these stresses with respect to the wear of the tread and the life of the tread reinforcement.

The invention consists in providing a tire for medium and heavy carrier vehicles having a tread, a radial carcass reinforcement anchored to at least one bead ring in each bead and a tread reinforcement formed of at least two plies of wires or cables parallel in each ply and crossed from one ply to the next, forming acute angles with the longitudinal direction of the tire, the radial carcass reinforcement having, when the tire is mounted on a rim and inflated to its operating pressure but not under load, as seen in meridian cross section, a neutral fiber whose point of intersection with the trace of the equatorial plane of the tire is at a radial distance from the point of contact of the tire with the flange of the rim at most equal to 0.65 times the maximum axial width of the neutral fiber, the width of the rim being at least equal to 0.88 times the maximum axial width of the neutral fiber, characterized by the fact that the tire being mounted on the rim and inflated to its operating pressure but not under load, the length of the segment of the neutral fiber of the radial carcass reinforcement between, on the one hand, a radially inner extreme point located at a radial distance outward of the point of contact of the tire with the flange of the rim equal to 0.1 times said radial distance between said point of contact and said point of intersection and, on the other hand, a radially outer extreme point located axially outward of said point of intersection and at a radial distance inward of said point of intersection equal to 0.1 times said radial distance between said point of contact and said point of intersection, is less than 1.20 times the distance between the two extreme points of said segment of the neutral fiber of the radial carcass reinforcement, by the fact that the beads of the tire being mounted on the rim in their operating position and the tire being not inflated and not under load, the neutral fiber of the radial carcass reinforcement passes through a point located, on the one hand, radially inward of the point of intersection of the neutral fiber of the radial carcass reinforcement with the trace of the equatorial plane at a distance at most equal to 0.075 times the maximum axial width of the neutral fiber of the radial carcass reinforcement when the tire is mounted and inflated but not under load and, on the other hand, axially outward of the trace of the equatorial plane at a distance equal to one-third of the maximum axial width of the neutral fiber of the radial carcass reinforcement of the tire when mounted and inflated, said neutral fiber of the radial carcass reinforcement being symmetrical with respect to the trace of the equatorial plane, and by the fact that the radial carcass reinforcement has, at least along said segment of its neutral fiber, a relative elongation of less than 2.5% under a force equal to 10% of its ultimate tensile strength.

It is advantageous to select a radial carcass reinforcement which has, at least along said segment of its neutral fiber contained between said two extreme points delimiting said segment, a relative elongation of less than 1% under a force equal to 10% of its utimate tensile strength. This can be achieved by using, for instance, wires or cables having a relative elongation of less than 1% under a force equal to 10% of the ultimate tensile strength.

It is advantageous for the width of the rim, measured in accordance with the existing standards, to be at most equal to 1.18 times the maximum axial width of the neutral fiber of the radial carcass reinforcement.

The radial carcass reinforcement is preferably anchored by being turned up towards the outside of the tire around at least one bead ring. Between the tread reinforcement and the radial carcass reinforcement there may also be a zone of parallelism centered on the equator. Along this zone a layer of rubber can be arranged between the said reinforcements.

It is advantageous to use a signal ply of cables, for example of steel wires, for the radial carcass reinforcement. In this case, the neutral fiber follows the core of the cable. In the case of a radial carcass reinforcement formed of several plies, the neutral fiber by convention follows a line equidistant from the outer ply and the inner ply forming said reinforcement.

Due to the path followed by the neutral fiber of the radial carcass reinforcement in accordance with the invention, defined both with respect to the tire when not under load but mounted and inflated to its operating pressure and with respect to the tire when not under load but mounted and not yet inflated, that is to say, for instance, deflated after mounting, the beads being held on the rim in their operating position, the curvature assumed by the neutral fiber of the radial carcass reinforcement under the effect of the inflation in the critical zones of the shoulders of the tire is such that the belting action of the tread reinforcement under the effect of the inflation to operating pressure is reduced to a zone of slight axial width.

From these provisions it results that when the tire in accordance with the invention is being inflated to its operating pressure, the radial distance from the surface of the tread, measured on one or the other edge of the tread, to the axis of rotation of the tire undergoes a relative increase of at most 1% and preferably at most 0.6%.

By operating pressure, there is understood the inflation pressure of the tire in the absence of heating due to travel, for instance measured at an ambient temperature of 20° Celsius.

The practically zero relative increase of the radial distance from the edges of the tread to the axis of rotation of the tire eliminates the stresses usually caused by the inflating of the tire to its operating pressure. This results in a considerable improvement in the resistance to separation between the plies of the tread reinforcement, to wear of the edges of the tread and to the formation of fatigue cracks in the bottoms of the grooves which may be present in the region of the edges of the tread.

It is also advantageous to vulcanize the tire in such a manner that at least the beads of the tire are in an axial position with respect to the equatorial plane and a radial position with respect to the axis of rotation of the tire which is close to that corresponding to the tire without load, mounted on its rim and inflated to its operating pressure, for instance by vulcanizing the tire on a rim (vulcanization rim) whose width is at least equal to the axial width of the rim (service rim) on which it is intended to be mounted. The axial width of the vulcanization rim is measured in accordance with the existing standards for service rims.

Preferably, furthermore, the tire being mounted on the rim but not inflated and not under load, the angle formed by the tangent to the neutral fiber of the radial carcass reinforcement at the radially inner extreme point of said segment of the neutral fiber of the radial carcass reinforcement with a line parallel to the trace of the equatorial plane of the tire is at most equal to 40° and preferably between 10° and 40°.

The invention also results in a decrease in the operating temperature at the edges of the tread reinforcement and in the resistance to rolling. This by way of comparison with a tire of the type in question designed for a rim having a width between 60% and 80% of the standardized maximum axial width of the tire. When such a tire is mounted on a rim whose width, referred to the maximum axial width of the tire, is close to that of the tire of the invention, a number of drawbacks are noted—faster wear of the edges of the tread, greater heating of the edges of the tread reinforcement. Increasing the inflation pressure does not remedy this, since one merely increases the harmful stresses in the critical regions of the tire.

On the other hand, U.S. Pat. No. 3,515,196 describes a tire in which the beads are arranged in the vicinity of the points where the radial carcass reinforcement attains its maximum axial width, in order to increase the diameter of the rim and have a tire whose outer surface is located in the extension of the hubcap which masks the wheel. In order to improve this aesthetic effect, an annular rib of rubber, integral with the tire, fills the space between the bead and the corresponding sidewall, protruding axially outwards of the flange of the rim. This aesthetic means forces the radial carcass reinforcement to follow a harmful meridian path under the effect of the inflation and brings the deformations of the tire upon operation into the region of the shoulders, concentrating them there, and is prejudicial to comfort.

Figure 2:
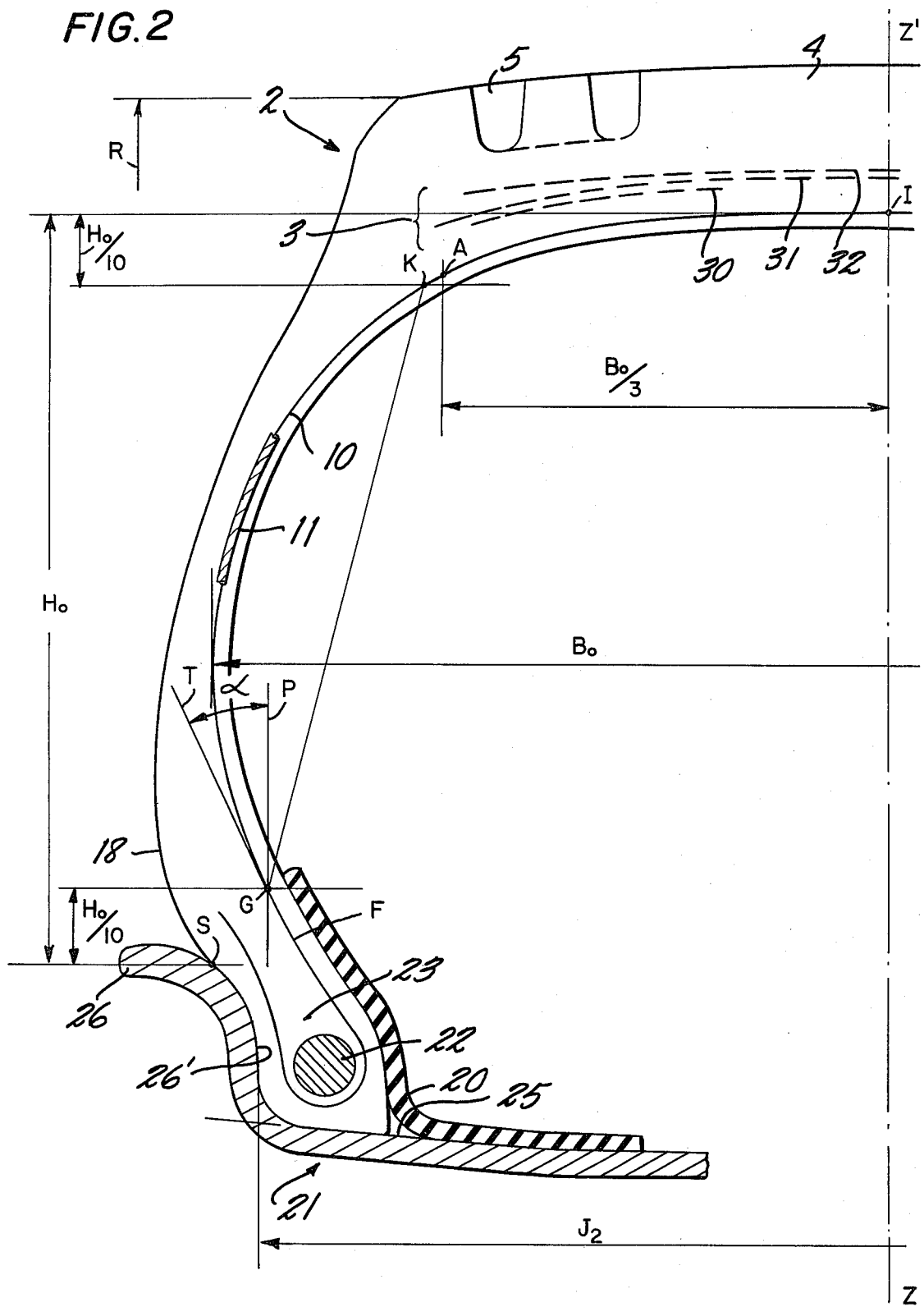

Two embodiments of the invention are shown in the drawing in which:

FIG. 1 shows in meridian half-section a tubeless tire mounted on a rim having standardized flanges and conical bead seats, the tire being inflated but not under load, and FIG. 2 shows in meridian half-section a tire with inner tube, mounted on a rim having standardized flanges and quasi-cylindrical bead seats, the tire being inflated but not under load.

In the drawing, the neutral fiber of the radial carcass reinforcement is represented by a single continuous line and the tread plies are represented by dash lines, without taking into account the actual thicknesses of the plies, since the principle of the invention is independent of such thicknesses.

The tires 1 and 2 shown in FIGS. 1 and 2, respectively, have a radial carcass reinforcement whose neutral fiber is designated by F. The radial carcass reinforcement is formed of a single ply of cables, one cable 11 being shown in part. This radial carcass reinforcement is anchored by being turned up towards the outside of the tire around a bead ring 12 of rectangular cross section in the beads 13 for the tire 1 of FIG. 1 and around a bead ring 22 of circular cross section in the bead 23 in the case of the tire 2 of FIG. 2.

The tread reinforcement 3 (FIGS. 1 and 2), which is arranged below the tread 4 and is of customary structure, has three superposed plies of cables 30, 31, 32. The cables of the radially inner ply 30 form an angle of 65° with respect to the longitudinal direction of the tire and the axial width of this ply is less than half the axial width of the tread reinforcement 3. The cables of the other two plies 31, 32 are crossed from one ply to the other and form angles of 22° (in absolute value) with respect to the longitudinal direction.

Circumferential and/or transverse grooves 5 are provided at least in the region of the edges of the tread 4.

The rim 14, shown in part in FIG. 1, is of the type with well base 15 and conical bead seats 16 inclined 15° with respect to the axis of rotation (not shown). The width $J_1$ of this rim 14, the conical bead seat 16, and the flanges 17 are measured as stipulated in the customary standards (T.R.A. or E.T.R.T.O.) for rims for tubeless tires having 15° bead seats and a well base.

In accordance with the invention, the rim width $J_1$ is at least equal to 0.88 times, and at most equal to 1.18 times, the maximum axial width $B_o$ of the neutral fiber F, the tire 1 not being under load but inflated to its operating pressure.

The outer surface 18 of the tire 1 of FIG. 1 contacts the flange 17 of the rim 14 at a point S which is radially and axially inward of the point M of maximum radial height of the flange 17. The length of the segment 10 of the neutral fiber F of the radial carcass reinforcement between, on the one hand, a radially inner extreme point G located at a radial distance outward of the point S of contact of the tire 1 with the flange 17 of the rim 14 equal to 0.1 times the maximum radial distance ($H_o$) between the point S of contact of the tire 1 with the flange 17 and the point I of intersection of the neutral fiber F with the trace ZZ' of the equatorial plane of the tire 1 on the (meridian) plane of the drawing and, on the other hand, a radially outer extreme point K located axially outward of the said point I of intersection of the neutral fiber F with the trace ZZ' of the equatorial plane of the tire and at a radial distance inward of said point I of intersection equal to 0.1 times the maximum radial distance $H_o$ between the point of contact S with the rim flange 17 and said point I of intersection, is less than 1.20 times the distance (GK) between the two extreme points G and K of said segment 10 of the neutral fiber F of the radial carcass reinforcement, the tire 1 being mounted on the rim 14 and inflated to its operating pressure but not under load (FIG. 1). In accordance with the invention, this radial distance $H_o$ from the equatorial point I of the neutral fiber F to the point S of contact of the tire 1 with the rim flange 17 is less than and at most equal to 0.65 times the maximum axial width $B_o$ of the neutral fiber F ($H_o \leq 0.65 B_o$), the tire 1 being mounted on the rim 14 and inflated to its operating pressure, but not under load (FIG. 1).

The tire 2 of FIG. 2 has an inner tube 20. The rim 21 on which it is mounted has a quasi-cylindrical bead seat 25 (maximum inclination about 5°) and accordingly a flange 26 of suitable height and of a profile contemplated by the customary standards. In this case, the width $J_2$ of the rim 21 in accordance with the invention is the distance between the portions 26' of the flanges 26, parallel to the trace ZZ' of the equatorial plane of the tire 2. In accordance with the invention, this rim width $J_2$ is at least equal to 0.88 times, and at most equal to 1.18 times, the maximum axial width $B_o$ of the neutral fiber F of the inflated tire 2.

The radial distance $H_o$ from the equatorial point I of the neutral fiber F to the point S of contact of the outer wall 18 of the sidewall of the tire 2 with the rim flange 26 is defined, as in the case of the tire 1 of FIG. 1, by the ratio ($H_o/B_o$) $\leq$ 0.65.

As in the case of the tire 1 of FIG. 1, the tire 2 of FIG. 2 has a radial carcass reinforcement whose neutral fiber F comprises a segment 10 between a radially inner extreme point G and a radially outer extreme point K. The length of this segment 10 is also less than 1.20 times the distance GK between the two extreme points G and K of said segment 10 when the tire is mounted on the rim 21, inflated to its operating pressure but not under load (FIG. 2). The radially inner extreme point G is located at a radial distance outward of the point S of contact with the rim 21 equal to 0.1 times the maximum radial height $H_o$ of the neutral fiber F of the carcass reinforcement. The radially outer extreme point K is located axially outward of the point I of intersection of the neutral fiber F with the trace ZZ' of the equatorial plane of the tire 2 and radially inward of this point I of intersection at a distance equal to 0.1 times the maximum radial height $H_o$ of the neutral fiber F.

When the tire 1 or 2 is mounted on the rim but is not yet inflated and is not under any load, the beads being in place on the rim, the neutral fiber F of the radial carcass reinforcement passes through a point A (FIGS. 1 and 2) which, being selected at a distance from the trace ZZ' of the equatorial plane equal to one-third of the maximum axial width $B_o$ of the neutral fiber F of the radial carcass reinforcement of the tire when inflated but not under load, is located at a radial distance from the point I at most equal to 0.075 times the said maximum axial width $B_o$. Furthermore, in this uninflated and unloaded condition, the angle $\alpha$ formed by the tangent GT to the neutral fiber F at the radially inner extreme point G with a line GP parallel to the trace ZZ' of the equatorial plane of the tire is, in accordance with the invention, at most equal to 40° and preferably is between 10° and 40°.

The invention unexpectedly results in a substantial reduction in the deflection assumed by the tire in accordance with the invention under a load identical to that of an existing tire having identical operating characteristics (pressure, load). The result is that, as the crown of the tire in accordance with the invention is only stressed slightly under the effect of the inflation pressure, it is also less stressed under the effect of the load which it is called upon to carry.

In the following examples, two tires in accordance with the invention are compared with ordinary tires whose maximum axial width of the carcass reinforcement and maximum radial height of the meridian cross section are close to those of the tires in accordance with the invention (see Table).

EXAMPLE 1

Tubeless tire $A_1$ in accordance with the invention of size 280/70 R 22.5 mounted on a rim of size 22.5×10.5 (diameter 22.5" and width J=10.5") compared with an ordinary tire $T_1$ of size 11.25/70 R 22.5 mounted on a rim of size 22.5×7.5 (J=7.5"). Load 6050 pounds at a pressure of 100 psi (2745 kg at 6.9 bars).

EXAMPLE 2

Tubeless tire $A_2$ in accordance with the invention of size 375/70 R 22.5 mounted on a rim of size 22.5×14 (J=14") compared with an ordinary tire $T_2$ of size 15 R 22.5 mounted on a rim of size 22.5×11.75 (J=11.75"). Load 9270 pounds at a pressure of 123 psi (4200 kg at 8.5 bars).

TABLE

|  | $A_1$ | $T_1$ | $A_2$ | $T_2$ |
|---|---|---|---|---|
| Maximum axial width ($B_o$) | 10.90" (277 mm) | 10.83" (275 mm) | 14.57" (370 mm) | 14.53" (369 mm) |
| Maximum radial height ($H_o$) from the point of contact S | 6.26" (159 mm) | 6.69" (170 mm) | 8.66" (220 mm) | 8.03" (204 mm) |
| Ratio $J/B_o$ | 0.96 | 0.69 | 0.96 | 0.81 |
| Ratio $H_o/B_o$ | 0.57 | 0.62 | 0.59 | 0.55 |
| Deflection under load | 1.29" (33 mm) | 1.52" (39 mm) | 1.39" (35 mm) | 1.60" (41 mm) |
| Relative increase in the radial distance apart of the edges of the tread | 0.6% | 1.4% | 0.6% | 1.7% |

When the tire in accordance with the invention, mounted on its rim, is inflated to its operating pressure, it is noted that the radial distance (R) from the surface of the edges of the tread to the axis of rotation of the tire undergoes a relative increase at most equal to 0.5% referred to the position occupied by the surface of the edges of the tread in the vulcanization mold.

What is claimed is:

1. A tire for medium and heavy carrier vehicles having a tread, a radial carcass reinforcement anchored to at least one bead ring in each bead and a tread reinforcement formed of at least two plies of wires or cables parallel in each ply and crossed from one ply to the next, forming acute angles with the longitudinal direction of the tire, the radial carcass reinforcement having, when the tire is mounted on a rim and inflated to its operating pressure but not under load, as seen in meridian cross section, a neutral fiber whose point of intersection with the trace of the equatorial plane of the tire is at a radial distance from the point of contact of the tire with the flange of the rim at most equal to 0.65 times the maximum axial width of the neutral fiber, the width of the rim being at least equal to 0.88 times the maximum axial width of the neutral fiber, characterized by the fact that the tire being mounted on the rim and inflated to its operating pressure but not under load, the length of the segment of the neutral fiber of the radial carcass reinforcement between, on the one hand, a radially inner extreme point located at a radial distance outward of the point of contact of the tire with the flange of the rim equal to 0.1 times said radial distance between said point of contact and said point of intersection and, on the other hand, a radially outer extreme point located axially outward of said point of intersection and at a radial distance inward of said point of intersection equal to 0.1 times said radial distance between said point of contact and said point of intersection, is less than 1.20 times the distance between the two extreme points of said segment of the neutral fiber of the radial carcass reinforcement, said point of contact being located radially and axially inward of the point of maximum radial height of the flange of the rim, by the fact that the beads of the tire being mounted on the rim in their operating position and the tire being not inflated and not under load, the neutral fiber of the radial carcass reinforcement passes through a point located, on the one hand, radially inward of the point of intersection of the neutral fiber of the radial carcass reinforcement with the trace of the equatorial plane at a distance at most equal to 0.075 times the maximum axial width of the neutral fiber of the radial carcass reinforcement when the tire is mounted and inflated but not under load and, on the other hand, axially outward of the trace of the equatorial plane at a distance equal to one-third of the maximum axial width of the neutral fiber of the radial carcass reinforcement of the tire when mounted and inflated, said neutral fiber of the radial carcass reinforcement being symmetrical with respect to the trace of the equatorial plane, and by the fact that the radial carcass reinforcement has, at least along said segment of its neutral fiber, a relative elongation of less than 2.5% under a force equal to 10% of its ultimate tensile strength, whereby the belting action of the tread reinforcement under the effect of inflation to operating pressure is reduced to a relatively narrow zone centered on the equatorial plane so as to avoid the generation of harmful stresses at the tread reinforcement edges.

2. The tire according to claim 1, characterized by the fact that the radial carcass reinforcement has, at least along said segment of its neutral fiber contained between said two extreme points delimiting said segment, a relative elongation of less than 1% under a force equal to 10% of its ultimate strength.

3. The tire according to claim 2, characterized by the fact that the radial carcass reinforcement is formed of wires or cables having a relative elongation of less than 1% under a force equal to 10% of the ultimate tensile strength.

4. The tire according to claim 1, characterized by the fact that the radial carcass reinforcement is formed of a single ply of cables possibly of steel wires.

5. The tire according to claim 1, characterized by the fact that the width of the rim is at most equal to 1.18 times the maximum axial width of the neutral fiber of the radial carcass reinforcement.

6. The tire according to claim 1, characterized by the fact that the angle formed by the tangent to the neutral fiber of the radial carcass reinforcement at the radially inner extreme point of said segment of the neutral fiber of the radial carcass reinforcement with a line parallel to the trace of the equatorial plane of the tire is at most equal to 40° and preferably is between 10° and 40°, the tire being mounted on the rim but not inflated and not under load.

7. The tire according to claim 1, characterized by the fact that when the tire mounted on the rim is inflated to its operating pressure, the radial distance from the surface of the edges of the tread to the axis of rotation of the tire undergoes a relative increase at most equal to 1% and preferably at most equal to 0.6%.

8. The tire according to claim 1, characterized by the fact that when the tire mounted on the rim is inflated to its operating pressure, the radial distance from the surface of the edges of the tread to the axis of rotation of the tire undergoes a relative increase at most equal to 0.5% referred to the position occupied by the surface of the edges of the tread in the vulcanization mold.

9. The tire according to claim 1, characterized by the fact that the tire is vulcanized in such a manner that at least its beads are in an axial position with respect to the trace of the equatorial plane and a radial position with respect to the axis of rotation of the tire which is close to that corresponding to the tire without load, mounted on its rim and inflated to its operating pressure.

10. The tire according to claim 1 or claim 9, characterized by the fact that the tire is vulcanized on a rim whose width is at least equal to the axial width of the rim on which it is intended to be mounted.

11. The tire according to claim 1, characterized by the fact that the tread has grooves at least in the region of the edges of the tread.

12. The tire according to claim 1, characterized by the fact that the tire is of the tubeless type intended to be mounted on a rim having bead seats inclined 15° with respect to the axis of rotation, and by the fact that the radial carcass reinforcement is anchored by being turned up towards the outside of the tire around at least one bead ring.

13. The tire according to claim 1, characterized by the fact that the tire is of the type with inner tube intended to be mounted on a rim having bead seats inclined at most 5° with respect to the axis of rotation, and by the fact that the radial carcass reinforcement is anchored by being turned up towards the outside of the tire around at least one bead ring.

* * * * *